T. E. ANDREWS, Jr.
WIRE FENCE.
APPLICATION FILED SEPT. 10, 1906. RENEWED JAN. 21, 1910.

1,003,312.

Patented Sept. 12, 1911.

2 SHEETS—SHEET 1.

WITNESSES
A. T. Palmer
Jerome C. Smith

INVENTOR
THOMAS E. ANDREWS, Jr.
BY HIS ATTORNEY
Everett E. Kent

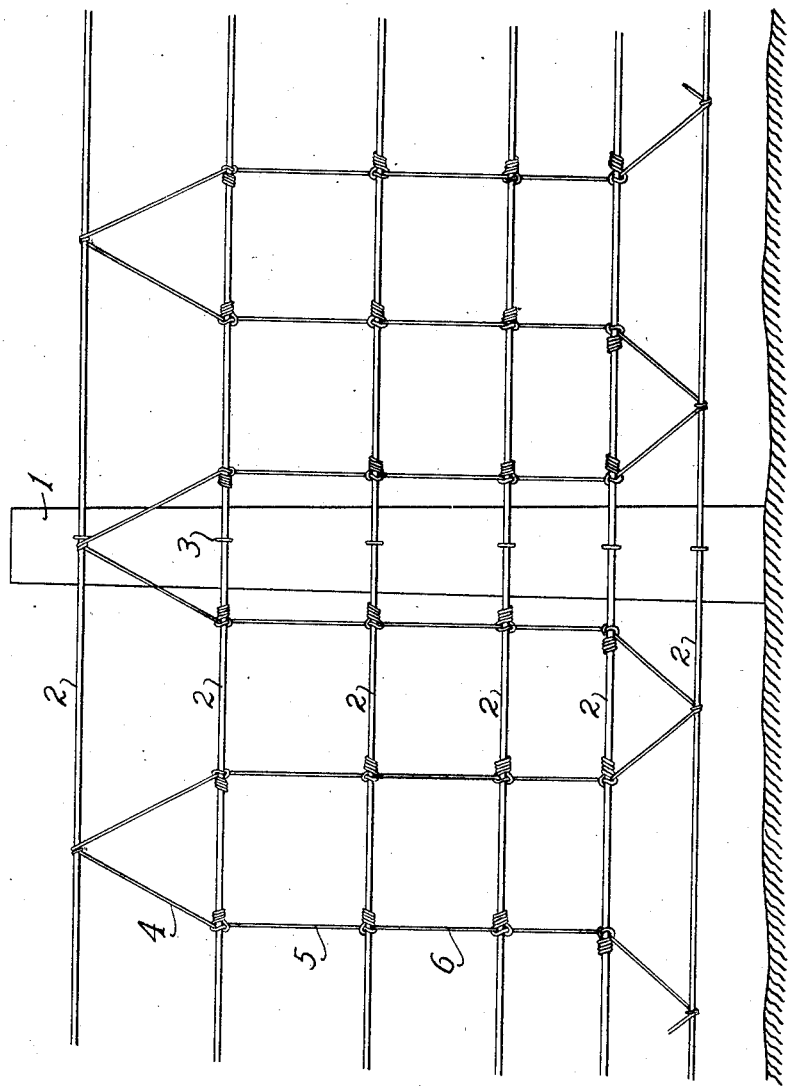

UNITED STATES PATENT OFFICE.

THOMAS E. ANDREWS, JR., OF FRANKLIN, TENNESSEE.

WIRE FENCE.

1,003,312. Specification of Letters Patent. Patented Sept. 12, 1911.

Application filed September 10, 1906, Serial No. 333,895. Renewed January 21, 1910. Serial No. 539,312.

*To all whom it may concern:*

Be it known that I, THOMAS E. ANDREWS, Jr., of Franklin, in the county of Williamson and State of Tennessee, have invented certain new and useful Improvements in Wire Fences, of which the following is a specification.

This invention relates to improvements in wire fences. In particular, it relates to fences in which a series of parallel line wires are tied with a succession of transverse sectional stay wires, and it comprises an improvement in the knots used for tying such wires.

The objects of the invention are to provide a fence in which the knots may be formed in a simple manner, in which a strain received by any one stay wire is transmitted about equally to the connecting stay wires and to the line wire; also one in which the stay wires serve as supports between the line wires, as well as serving as ties, thus making the fence stand up with stiffness; also a fence and knot having the other advantages of the structure hereinafter described.

These objects are accomplished in the method illustrated in the accompanying drawings, in which—

Figure 1:
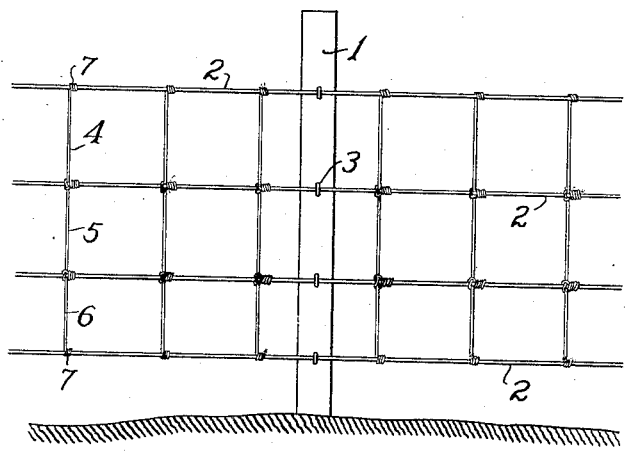
Figure 2:
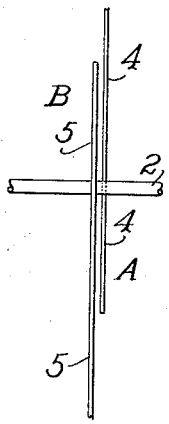
Figure 3:
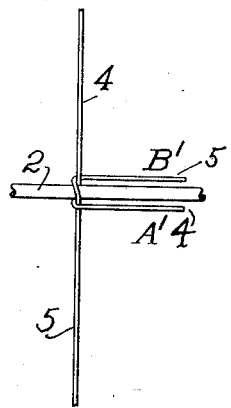
Figure 4:
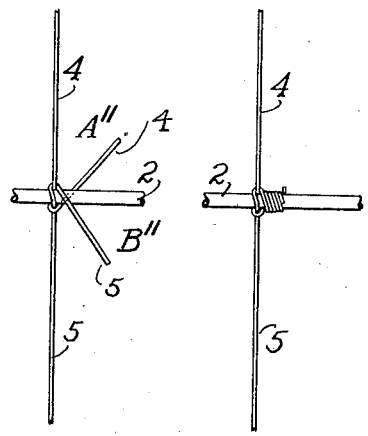
Figure 5:
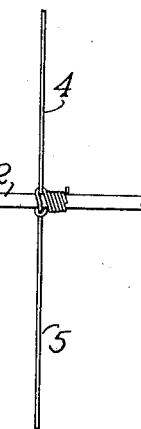

Figure 1 represents a completed section of the fence embodying the invention; Fig. 2 represents the arrangement of a line wire and stay wires running in opposite directions therefrom, previous to tying a knot; Fig. 3 represents an early stage in tying the knot; Fig. 4 represents a later stage of the same; Fig. 5 represents one of the completed knots; and Fig. 6 represents another arrangement of wires which may be used in the fence.

Referring to the drawings: 1 represents a fence post, to which line wires 2 may be fastened in any suitable manner, here represented as fastened by staples 3. These line wires are intended to run longitudinally of the fence, and they are joined by transverse sectional stay wires which may be all alike in their essential particulars and arrangements, but the sections of which are designated by different numerals 4, 5, 6 in the drawings, for purposes of clearness in this description, the wires 4, 4 being located between the topmost line wire 2 and the line wire next below it, the stay wires 5, 5 being next lower, and the wires 6, 6 still lower. It will be understood that as many line wires as desired may be used, and as many stay wires between them, the intervening spaces between adjacent line wires and between adjacent stay wires being as small or as large as suit the requirements of the situation.

The knot by which the stay wires are joined to the middle line wires forms an important feature of the invention, and is so arranged that the stay wire proceeding in an upward direction from the line wire and that proceeding downward are firmly interlinked and wound together around the line wire. A complete knot is shown in Fig. 5. The knot may be tied by the following method: A stay wire 4 is placed in vertical position against the back of the line wire 2, with its end projecting a short distance below it in the position marked A in Fig. 2, and another stay wire 5 is similarly placed in front of the line wire, with its end in the position B projecting a short distance above the line wire. The first move is to bend the end 4 (below the line wire) around the stock of 5 into position A′ (Fig. 3) parallel with the line wire, and to bend the end of 5 (above the line wire) around the stock of 4 to a position B′ parallel with the line wire and pointing in the same direction as the position A′, as shown in Fig. 3. The final step is to twist both ends from positions A′ and B′ around the intervening line wire in the direction in which the twisting of each has already been begun by the twisting of 5 around 4 to B″ and the twisting of 4 around 5 to A″. The first stage of this final twisting is clearly represented in Fig. 4, where the end of 4 is seen to have moved from position A′ to position A″, and the end of 5 is seen to have moved from position B′ to position B″. In the final position shown in Fig. 5 the ends of 4 and 5 are coiled tightly about line wire 2. When thus constructed, any pull upon one of the stay wires, for example 5, tends first to pull downward upon stay wire 4, tightening the bight of 5 about 4 and thus transmitting the stress through 4 to its fastening above, where it may be further transmitted and distributed; and at the same time the pull upon 5 is resisted and absorbed by the line wire 2 in both directions. The stress is divided about equally between the upper stay wire 4 and the two directions of the line wire 2, thus enabling the wires to withstand a greater stress than is possible with some forms of knot known to me in which the strain is thrown mainly upon the stay wires, or others in which the strain is thrown mainly upon the line wires. The greater the strain upon the stay wire 5, the tighter is the line wire gripped and the fastening to the adjoining stay wire 4. Thus, since the knot cannot slip, the ultimate resisting force of the fence depends upon the strength of material, and the fence will resist so long as the material holds unbroken. It is also to be observed that the knot here described differs materially from those fences in which the sectional stays are put together after the manner of hinges, in which case the fence tends to collapse if the staple holding the upper line wire gives out. There being no hinge in the present knot, the line wire braces the stay against collapse in one direction and the loop in the connecting stay braces it against collapse in the other direction. The loops in the stays act as slip-nooses and also as braces; gripping the wire when under strain, and holding it straight when at rest. The twists of the stay wires take firm hold of the line wire, and this, together with the two nooses, makes a knot which is difficult to slip on the line wire, and which cannot possibly be slipped but a short distance, owing to the tightening of the loops.

In constructing the section of fence the top stay wire 4 may be fastened to the topmost line wire in any suitable manner, as by a coil 7, and the same device may be used at the bottom line wire. If the stay wire 4 be placed behind the fence the wire 5 will be in front of it, as shown in Fig. 2, both at its upper and at its lower part; and the stay wire 6 will be behind it, each sectional stay being thus on the opposite side of the fence from the one above it and the one below it. By the construction here shown the line wire may be drawn taut, without kinks or loops. All the bending is done upon the stay wire, which may be of smaller gage, therefore more easily handled, and may be worked with smaller tools. By bringing the ends of the stay wires side by side both may be twisted around the line wire at one operation, and when twisted each helps to hold the other from slipping.

The invention is not limited to the specific form already described, but may be varied in its application. One variation is illustrated in Fig. 6, in which the upper stay 4 is carried obliquely to the top line wire, is coiled around it once or twice, and returns obliquely to the next adjacent knot on the line wire from which it started. The line wires may be nearer together at the bottom than elsewhere, if desired, thus making a smaller mesh.

The invention may also be applied to wire fabrics used for other purposes as well as fences, without departing from the scope of the patent.

I claim:

1. A structure, comprising line wires and sectional transverse stay wires in which the adjacent sections respectively approach the line from above and below on opposite sides thereof, pass beyond the line wire and are there looped around each other, with the line wire intervening between the loops and not included in either, and are then coiled around the line wire.

2. A structure, comprising line wires and stay wires connecting the same transversely, in which adjacent stays are each first looped around the other, with the line wire intervening between the loops and not included in either, and are then coiled together around the line wire.

3. A structure, comprising line wires and transverse stay wires joined thereto by knots in which the stays, engaged in the knots, approach the line wire from opposite directions, pass beyond it and there are each bent around the other into a common direction, the line wire intervening between the bends and not included in either, and are then coiled together around the line wire.

4. A structure comprising horizontal line wires and stay wires arranged in separate sections vertically, adjacent sections of the stays being on opposite sides of the included line wire and joined by knots in which each passes beyond the line wire and there is looped around the vertical portion of the other, with the line wire intervening between the loops and not included in either, and then is coiled around the line wire.

5. A structure, comprising line wires and sectional transverse stay wires, in which the adjacent sections are joined by each being looped around the other alone, with the line wire intervening between the loops and not included in either; the section ends being subsequently coiled around the line wire.

In testimony whereof I have affixed my signature, in presence of two witnesses.

THOMAS E. ANDREWS, Jr.

Witnesses:
    JAS. P. HANNER,
    J. E. SHORT.

---

Copies of this patent may be obtained for five cents each, by addressing the "Commissioner of Patents, Washington, D. C."